United States Patent
Tang (10) Patent No.: US 12,475,940 B2
(45) Date of Patent: Nov. 18, 2025

(54) METHOD FOR CONTROLLING NAND FLASH MEMORY TO IMPLEMENT XNOR OPERATION

(71) Applicant: UNIM Innovation (Wuxi) Co., Ltd., Wuxi (CN)

(72) Inventor: Qiang Tang, Wuxi (CN)

(73) Assignee: UNIM Innovation (Wuxi) Co., Ltd., Wuxi (CN)

(*) Notice: Subject to any disclaimer, the term of this patent is extended or adjusted under 35 U.S.C. 154(b) by 119 days.

(21) Appl. No.: 18/534,834

(22) Filed: Dec. 11, 2023

(65) Prior Publication Data

US 2024/0194246 A1 Jun. 13, 2024

(30) Foreign Application Priority Data

Dec. 13, 2022 (CN) .......................... 202211592299.5

(51) Int. Cl.
*G11C 7/00* (2006.01)
*G11C 11/4091* (2006.01)
*G11C 11/4093* (2006.01)
*G11C 11/4096* (2006.01)

(52) U.S. Cl.
CPC ...... *G11C 11/4091* (2013.01); *G11C 11/4093* (2013.01); *G11C 11/4096* (2013.01)

(58) Field of Classification Search
CPC ............ G11C 11/4091; G11C 11/4093; G11C 11/4096
USPC ...................................... 365/189.011
See application file for complete search history.

(56) References Cited

U.S. PATENT DOCUMENTS

| | | | | |
|---|---|---|---|---|
| 8,559,223 | B2* | 10/2013 | Takashima | G11C 16/0408 365/185.05 |
| 10,474,525 | B2* | 11/2019 | Sharon | G06F 11/1048 |
| 10,957,396 | B2* | 3/2021 | Lee | G11C 11/54 |
| 12,057,162 | B2* | 8/2024 | Lin | G11C 7/1006 |
| 2024/0194224 | A1* | 6/2024 | Salta | G11B 27/028 |
| 2024/0194271 | A1* | 6/2024 | Tang | G11C 11/54 |

* cited by examiner

*Primary Examiner* — Viet Q Nguyen
(74) *Attorney, Agent, or Firm* — ZIEGLER IP LAW GROUP, LLC.

(57) ABSTRACT

The present invention provides a method for controlling a NAND flash memory to implement an XNOR operation. First word lines and second word lines are connected to sense amplifiers in a one-to-one correspondence manner. The XNOR operation of the NAND flash memory is implemented by controlling a data storage mode and a voltage of the word lines.

15 Claims, 6 Drawing Sheets

```
┌─────────────────────────────────────────────────────────────────────┐ S0
│ Provide a NAND flash memory, where the NAND flash memory includes   │
│ at least one first memory block, at least one second memory block,  │
│ and multiple sense amplifiers, the first memory block includes      │
│ multiple first synaptic strings, multiple first bit lines, and      │
│ multiple first word lines, each of the first synaptic strings       │
│ includes a first drain selector and a first memory module connected │
│ in series, the first memory module includes multiple first memory   │
│ cells connected in series, the first synaptic strings are connected │
│ to the first bit lines in a one-to-one correspondence manner, the   │
│ first word lines are connected to all the first memory cells, the   │
│ second memory block includes multiple second synaptic strings,      │
│ multiple second bit lines, and multiple second word lines, each of  │
│ the second synaptic strings includes a second drain selector and a  │
│ second memory module connected in series, the second memory module  │
│ includes multiple second memory cells connected in series, the      │
│ second synaptic strings are connected to the second bit lines in a  │
│ one-to-one correspondence manner, the second word lines are         │
│ connected to all the second memory cells, and the first word lines  │
│ and the second word lines are connected to the sense amplifiers in  │
│ a one-to-one correspondence manner                                  │
└─────────────────────────────────────────────────────────────────────┘
                                    ↓                                   S1
┌─────────────────────────────────────────────────────────────────────┐
│ Use the first synaptic string and the second synaptic string        │
│ connected to a same one of the sense amplifiers as associated       │
│ synaptic strings, use any one of the first memory cells of the      │
│ first synaptic string used as the associated synaptic string as a   │
│ first memory cell to be used, use any one of the second memory      │
│ cells of the second synaptic string used as the associated synaptic │
│ string as a second memory cell to be used, write first data into    │
│ the first memory cell to be used, and write second data into the    │
│ second memory cell to be used, where the first data and the second  │
│ data are mutually inverted data                                     │
└─────────────────────────────────────────────────────────────────────┘
                                    ↓                                   S2
┌─────────────────────────────────────────────────────────────────────┐
│ Use the remaining first memory cells of the first synaptic string   │
│ used as the associated synaptic string as third memory cells to be  │
│ used, use the remaining second memory cells of the second synaptic  │
│ string used as the associated synaptic string as fourth memory      │
│ cells to be used, write third data into some or all of the third    │
│ memory cells to be used, and write fourth data into some or all of  │
│ the fourth memory cells to be used                                  │
└─────────────────────────────────────────────────────────────────────┘
                                    ↓                                   S3
┌─────────────────────────────────────────────────────────────────────┐
│ Apply a first potential voltage to a corresponding one of the first │
│ word lines connected to the first memory cell to be used, apply a   │
│ second potential voltage to a corresponding one of the second word  │
│ lines connected to the second memory cell to be used, apply a third │
│ potential voltage to the first drain selector, apply a fourth       │
│ potential voltage to the second drain selector, apply a fifth       │
│ potential voltage to a corresponding one of the first word lines    │
│ connected to the third memory cells to be used in which the third   │
│ data is written, apply a sixth potential voltage to a corresponding │
│ one of the second word lines connected to the fourth memory cells   │
│ to be used in which the fourth data is written, and apply a seventh │
│ potential voltage to a corresponding one of the first word lines    │
│ connected to the third memory cells to be used that do not store    │
│ data and a corresponding one of the second word lines connected to  │
│ the fourth memory cells to be used that do not store data           │
└─────────────────────────────────────────────────────────────────────┘
                                    ↓                                   S4
┌─────────────────────────────────────────────────────────────────────┐
│ Read the data from the first synaptic string and the second         │
│ synaptic string used as the associated synaptic strings by the      │
│ corresponding one of the sense amplifier                            │
└─────────────────────────────────────────────────────────────────────┘
```

METHOD FOR CONTROLLING NAND FLASH MEMORY TO IMPLEMENT XNOR OPERATION

TECHNICAL FIELD

The present invention relates to the technical field of NAND flash memories, in particular to a method for controlling a NAND flash memory to implement an XNOR operation.

BACKGROUND

Figure 1:
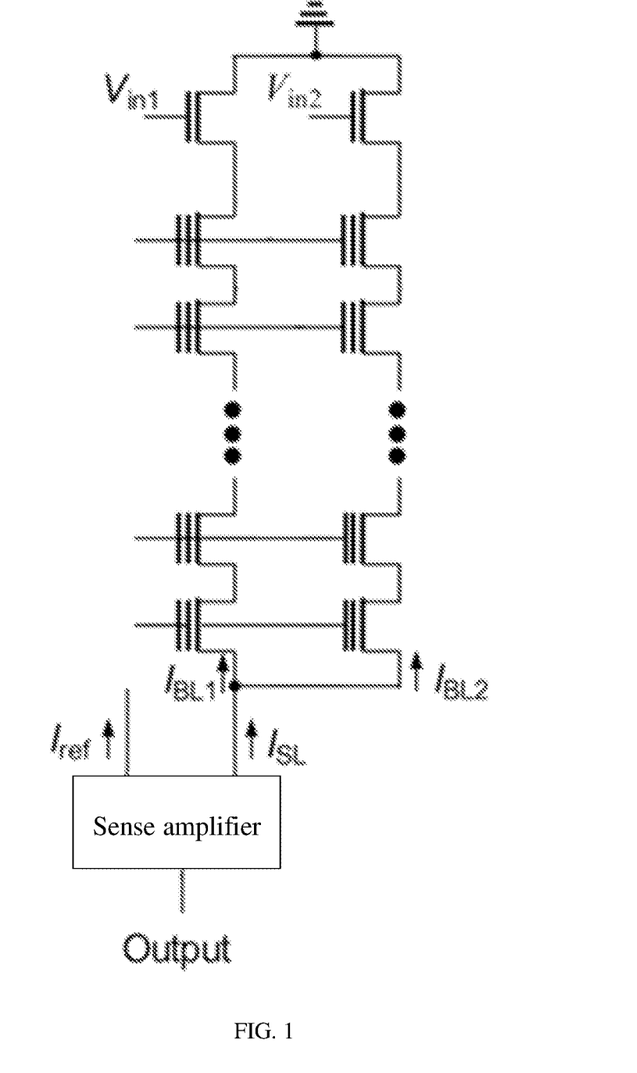
FIG. 1 is a schematic diagram of a circuit of a NAND flash memory implementing an XNOR operation in the prior art.
Figure 2:
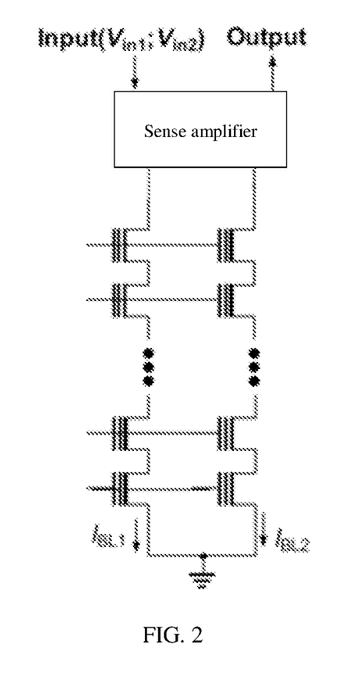
FIG. 2 is a schematic diagram of a circuit of another NAND flash memory implementing an XNOR operation in the prior art.

FIG. 1 is a schematic diagram of a circuit of a NAND flash memory implementing an XNOR operation in the prior art. FIG. 2 is a schematic diagram of a circuit of another NAND flash memory implementing an XNOR operation in the prior art. Referring to FIG. 1 and FIG. 2, a sense amplifier is connected to two bit lines, which is incompatible with the normal NAND flash memory; and each bit line is controlled by an individual switch, which is also incompatible with a structure of the normal NAND flash memory and will increase the area cost.

Therefore, it is necessary to provide a novel method for controlling a NAND flash memory to implement an XNOR operation, to solve the above problems in the prior art.

SUMMARY

An objective of the present invention is to provide a method for controlling a NAND flash memory to implement an XNOR operation, which implements the XNOR operation on the basis of being compatible with a structure of the normal NAND flash memory.

To achieve the above objective, the method for controlling a NAND flash memory to implement an XNOR operation according to the present invention includes the following steps:

S0: providing a NAND flash memory, where the NAND flash memory includes at least one first memory block, at least one second memory block, and multiple sense amplifiers, the first memory block includes multiple first synaptic strings, multiple first bit lines, and multiple first word lines, each of the first synaptic strings includes a first drain selector and a first memory module connected in series, the first memory module includes multiple first memory cells connected in series, the first synaptic strings are connected to the first bit lines in a one-to-one correspondence manner, the first word lines are connected to all the first memory cells, the second memory block includes multiple second synaptic strings, multiple second bit lines, and multiple second word lines, each of the second synaptic strings includes a second drain selector and a second memory module connected in series, the second memory module includes multiple second memory cells connected in series, the second synaptic strings are connected to the second bit lines in a one-to-one correspondence manner, the second word lines are connected to all the second memory cells, and the first word lines and the second word lines are connected to the sense amplifiers in a one-to-one correspondence manner;

S1: taking the first synaptic string and the second synaptic string connected to a common one of the sense amplifiers as associated synaptic strings, taking any one of the first memory cells of the first synaptic string used as the associated synaptic string as a first memory cell to be used, taking any one of the second memory cells of the second synaptic string used as the associated synaptic string as a second memory cell to be used, writing first data into the first memory cell to be used, and writing second data into the second memory cell to be used, where the first data and the second data are mutually inverted data;

S2: taking the remaining first memory cells of the first synaptic string used as the associated synaptic string as a third memory cell or third memory cells to be used, taking the remaining second memory cells of the second synaptic string used as the associated synaptic string as a fourth memory cell or fourth memory cells to be used, writing third data into part or all of the third memory cell or third memory cells to be used, and writing fourth data into part or all of the fourth memory cell or fourth memory cells to be used;

S3: applying a first potential voltage to a corresponding one of the first word lines connected to the first memory cell to be used, applying a second potential voltage to a corresponding one of the second word lines connected to the second memory cell to be used, applying a third potential voltage to the first drain selector, applying a fourth potential voltage to the second drain selector, applying a fifth potential voltage to a corresponding one of the first word lines connected to the third memory cell or third memory cells to be used in which the third data is written, applying a sixth potential voltage to a corresponding one of the second word lines connected to the fourth memory cell or fourth memory cells to be used in which the fourth data is written, and applying a seventh potential voltage to a corresponding one of the first word lines connected to the third memory cell or third memory cells to be used that do not store data and a corresponding one of the second word lines connected to the fourth memory cell or fourth memory cells to be used that do not store data; and S4: reading the data from the first synaptic string and the second synaptic string used as the associated synaptic strings by the corresponding one of the sense amplifiers.

The method for controlling a NAND flash memory to implement an XNOR operation has the following beneficial effects: one sense amplifier is connected to one bit line of one memory block; on the basis of being compatible with the normal NAND flash memory, the first synaptic string and the second synaptic string connected to the common one of the sense amplifiers are used as the associated synaptic strings, any one of the first memory cells of the first synaptic string used as the associated synaptic string is used as the first memory cell to be used, any one of the second memory cells of the second synaptic string used as the associated synaptic string is used as the second memory cell to be used, the first data is written into the first memory cell to be used, and the second data is written into the second memory cell to be used, where the first data and the second data are mutually the inverted data; the remaining first memory cells of the first synaptic string used as the associated synaptic string are used as the third memory cell or third memory cells to be used, the remaining second memory cells of the second synaptic string used as the associated synaptic string are used as the fourth memory cell or fourth memory cells to be used, the third data is written into part or all of the third memory cell or third memory cells to be used, and the fourth data is written into part or all of the fourth memory cell or fourth memory cells to be used; the first potential voltage is applied to the corresponding one of the first word lines connected to the first memory cell to be used, the second potential voltage is applied to the corresponding one of the second word lines connected to the second memory cell to be used, the third potential voltage is applied to the first drain selector, the fourth potential voltage is applied to the second drain selector, the fifth potential voltage is applied to the corresponding one of the first word lines connected to the third memory cell or third memory cells to be used in which the third data is written, the sixth potential voltage is applied to the corresponding one of the second word lines connected to the fourth memory cell or fourth memory cells to be used in which the fourth data is written, and the seventh potential voltage is applied to the corresponding one of the first word lines connected to the third memory cell or third memory cells to be used that do not store the data and the corresponding one of the second word lines connected to the fourth memory cell or fourth memory cells to be used that do not store the data; and the data is read from the first synaptic string and the second synaptic string used as the associated synaptic strings by the corresponding one of the sense amplifiers. The XNOR operation of the NAND flash memory is implemented by controlling a data storage mode and a voltage of the word lines.

Optionally, before the step S1 is performed, the method further includes a threshold voltage setting step; the first data, the second data, the third data, and the fourth data are all binary values; and when the first data is a binary value of 1 and the second data is a binary value of 0, the threshold voltage setting step includes:

setting a threshold voltage of the first memory cell to be used as a first threshold voltage, setting a threshold voltage of the second memory cell to be used as a second threshold voltage, and setting a threshold voltage of the third memory cell or third memory cells to be used that do not store the data and the fourth memory cell or fourth memory cells to be used that do not store the data as the first threshold voltage, where the first threshold voltage is less than the second threshold voltage.

Optionally, before the step S1 is performed, the method further includes a threshold voltage setting step; the first data, the second data, the third data, and the fourth data are all binary values; and when the first data is a binary value of 0 and the second data is a binary value of 1, the threshold voltage setting step includes:

setting a threshold voltage of the second memory cell to be used as a first threshold voltage, setting a threshold voltage of the first memory cell to be used as a second threshold voltage, and setting a threshold voltage of the third memory cell or third memory cells to be used that do not store the data and the fourth memory cell or fourth memory cells to be used that do not store the data as the first threshold voltage, where the first threshold voltage is less than the second threshold voltage.

Optionally, the threshold voltage setting step further includes:

when the third data is the binary value of 1 and the fourth data is the binary value of 0, setting a threshold voltage of the third memory cell or third memory cells to be used that store the third data as the first threshold voltage, and setting a threshold voltage of the fourth memory cell or fourth memory cells to be used that store the fourth data as the second threshold voltage.

Optionally, the threshold voltage setting step further includes:

when the third data is the binary value of 0 and the fourth data is the binary value of 1, setting a threshold voltage of the third memory cell or third memory cells to be used that store the third data as the second threshold voltage, and setting a threshold voltage of the fourth memory cell or fourth memory cells to be used that store the fourth data as the first threshold voltage.

Optionally, the threshold voltage setting step further includes:

when the third data is the binary value of 0 and the fourth data is the binary value of 0, setting a threshold voltage of the third memory cell or third memory cells to be used that store the third data as the second threshold voltage, and setting a threshold voltage of the fourth memory cell or fourth memory cells to be used that store the fourth data as the second threshold voltage.

Optionally, the second potential voltage is equal to the first potential voltage, the first potential voltage is greater than the first threshold voltage and less than the second threshold voltage, the third potential voltage is greater than a threshold voltage of the first drain selector, the fourth potential voltage is greater than a threshold voltage of the second drain selector, the fifth potential voltage is greater than the second threshold voltage, the sixth potential voltage is greater than the first threshold voltage and less than the second threshold voltage, and the seventh potential voltage is greater than the first threshold voltage.

Optionally, the second potential voltage is equal to the first potential voltage, the first potential voltage is greater than the first threshold voltage and less than the second threshold voltage, the third potential voltage is greater than a threshold voltage of the first drain selector, the fourth potential voltage is greater than a threshold voltage of the second drain selector, the fifth potential voltage is greater than the first threshold voltage and less than the second threshold voltage, the sixth potential voltage is greater than the second threshold voltage, and the seventh potential voltage is greater than the first threshold voltage.

Optionally, the threshold voltage setting step further includes:

when the third data is the binary value of 0 and the fourth data is the binary value of 0, setting a threshold voltage of the third memory cell or third memory cells to be used that store the third data as a third threshold voltage, and setting a threshold voltage of the fourth memory cell or fourth memory cells to be used that store the fourth data as the third threshold voltage, where a range of the third threshold voltage is greater than a range of the second threshold voltage.

Optionally, the second potential voltage is equal to the first potential voltage, the first potential voltage is greater than the first threshold voltage and less than the second threshold voltage, the third potential voltage is greater than a threshold voltage of the first drain selector, the fourth potential voltage is greater than a threshold voltage of the second drain selector, the fifth potential voltage is greater than the third threshold voltage, the sixth potential voltage is less than the third threshold voltage, and the seventh potential voltage is greater than the first threshold voltage.

Optionally, the second potential voltage is equal to the first potential voltage, the first potential voltage is greater than the first threshold voltage and less than the second threshold voltage, the third potential voltage is greater than a threshold voltage of the first drain selector, the fourth potential voltage is greater than a threshold voltage of the second drain selector, the fifth potential voltage is less than the third threshold voltage, the sixth potential voltage is greater than the third threshold voltage, and the seventh potential voltage is greater than the first threshold voltage.

Optionally, the second potential voltage is equal to the first potential voltage, the first potential voltage is greater than the first threshold voltage and less than the second threshold voltage, the third potential voltage is greater than a threshold voltage of the first drain selector, the fourth potential voltage is less than a threshold voltage of the second drain selector, the fifth potential voltage is greater than the second threshold voltage, the sixth potential voltage is greater than the second threshold voltage, and the seventh potential voltage is greater than the first threshold voltage.

Optionally, the second potential voltage is equal to the first potential voltage, the first potential voltage is greater than the first threshold voltage and less than the second threshold voltage, the third potential voltage is less than a threshold voltage of the first drain selector, the fourth potential voltage is greater than a threshold voltage of the second drain selector, the fifth potential voltage is greater than the second threshold voltage, the sixth potential voltage is greater than the second threshold voltage, and the seventh potential voltage is greater than the first threshold voltage.

Optionally, the first potential voltage is greater than the second threshold voltage and less than the first threshold voltage, the second potential voltage is less than the second threshold voltage, the third potential voltage is greater than a threshold voltage of the first drain selector, the fourth potential voltage is greater than a threshold voltage of the second drain selector, and the fifth potential voltage, the sixth potential voltage, and the seventh potential voltage are greater than the first threshold voltage.

Optionally, the second potential voltage is greater than the second threshold voltage and less than the first threshold voltage, the first potential voltage is less than the second threshold voltage, the third potential voltage is greater than a threshold voltage of the first drain selector, the fourth potential voltage is greater than a threshold voltage of the second drain selector, and the fifth potential voltage, the sixth potential voltage, and the seventh potential voltage are greater than the first threshold voltage.

BRIEF DESCRIPTION OF THE DRAWINGS

FIG. 3 is a flowchart of a method for controlling a NAND flash memory to implement an XNOR operation according to the present invention;

DESCRIPTION OF THE EMBODIMENTS

To make the objectives, technical solutions and advantages of the present disclosure more clearly, the following clearly and completely describes the technical solutions in the embodiments of the present disclosure with reference to the accompanying drawings in the embodiments of the present disclosure. Apparently, the described embodiments are merely a part rather than all of the embodiments of the present disclosure. Apparently, the embodiments described are some rather than all of the embodiments of the present invention. All other embodiments obtained by a person of ordinary skill in the art based on the embodiments of the present disclosure without creative efforts shall fall within the protection scope of the present disclosure. Unless otherwise defined, technical terms or scientific terms used herein shall have their ordinary meanings as understood by those of ordinary skill in the art to which the present disclosure belongs. The similar term such as "include/comprise" used herein refers to that an element or item occurring before the term covers elements or items listed after the term and their equivalents, without excluding other elements or items.

In view of the problems in the prior art, an embodiment of the present invention provides a method for controlling a NAND flash memory to implement an XNOR operation. Referring to FIG. 3, the method for controlling a NAND flash memory to implement an XNOR operation includes the following steps:

S0: providing a NAND flash memory, where the NAND flash memory includes at least one first memory block, at least one second memory block, and multiple sense amplifiers, the first memory block includes multiple first synaptic strings, multiple first bit lines, and multiple first word lines, each of the first synaptic strings includes a first drain selector and a first memory module connected in series, the first memory module includes multiple first memory cells connected in series, the first synaptic strings are connected to the first bit lines in a one-to-one correspondence manner, the first word lines are connected to all the first memory cells, the second memory block includes multiple second synaptic strings, multiple second bit lines, and multiple second word lines, each of the second synaptic strings includes a second drain selector and a second memory module connected in series, the second memory module includes multiple second memory cells connected in series, the second synaptic strings are connected to the second bit lines in a one-to-one correspondence manner, the second word lines are connected to all the second memory cells, and the first word lines and the second word lines are connected to the sense amplifiers in a one-to-one correspondence manner;

S1: taking the first synaptic string and the second synaptic string connected to a common one of the sense amplifiers as associated synaptic strings, taking any one of the first memory cells of the first synaptic string used as the associated synaptic string as a first memory cell to be used, taking any one of the second memory cells of the second synaptic string used as the associated synaptic string as a second memory cell to be used, writing first data into the first memory cell to be used, and writing second data into the second memory cell to be used, where the first data and the second data are mutually inverted data;

S2: taking the remaining first memory cells of the first synaptic string used as the associated synaptic string as third memory cell or third memory cells to be used, taking the remaining second memory cells of the second synaptic string used as the associated synaptic string as fourth memory cell or fourth memory cells to be used, writing third data into part or all of the third memory cell or third memory cells to be used, and writing fourth data into part or all of the fourth memory cell or fourth memory cells to be used;

S3: applying a first potential voltage to a corresponding one of the first word lines connected to the first memory cell to be used, applying a second potential voltage to a corresponding one of the second word lines connected to the second memory cell to be used, applying a third potential voltage to the first drain selector, applying a fourth potential voltage to the second drain selector, applying a fifth potential voltage to a corresponding one of the first word lines connected to the third memory cell or third memory cells to be used in which the third data is written, applying a sixth potential voltage to a corresponding one of the second word lines connected to the fourth memory cell or fourth memory cells to be used in which the fourth data is written, and applying a seventh potential voltage to a corresponding one of the first word lines connected to the third memory cell or third memory cells to be used that do not store data and a corresponding one of the second word lines connected to the fourth memory cell or fourth memory cells to be used that do not store data; and S4: reading the data from the first synaptic string and the second synaptic string used as the associated synaptic strings by the corresponding one of the sense amplifiers.

In some embodiments, before the step S1 is performed, the method further includes a threshold voltage setting step; the first data, the second data, the third data, and the fourth data are all binary values; and when the first data is a binary value of 1 and the second data is a binary value of 0, the threshold voltage setting step includes:

setting a threshold voltage of the first memory cell to be used as a first threshold voltage, setting a threshold voltage of the second memory cell to be used as a second threshold voltage, and setting a threshold voltage of the third memory cell or third memory cells to be used that do not store the data and the fourth memory cell or fourth memory cells to be used that do not store the data as the first threshold voltage, where the first threshold voltage is less than the second threshold voltage.

In yet some embodiments, before the step S1 is performed, the method further includes a threshold voltage setting step; the first data, the second data, the third data, and the fourth data are all binary values; and when the first data is a binary value of 0 and the second data is a binary value of 1, the threshold voltage setting step includes:

setting a threshold voltage of the second memory cell to be used as a first threshold voltage, setting a threshold voltage of the first memory cell to be used as a second threshold voltage, and setting a threshold voltage of the third memory cell or third memory cells to be used that do not store the data and the fourth memory cell or fourth memory cells to be used that do not store the data as the first threshold voltage, where the first threshold voltage is less than the second threshold voltage.

In some first embodiments, the second potential voltage is equal to the first potential voltage, the first potential voltage is greater than the first threshold voltage and less than the second threshold voltage, the third potential voltage is greater than a threshold voltage of the first drain selector, the fourth potential voltage is less than a threshold voltage of the second drain selector, the fifth potential voltage is greater than the second threshold voltage, the sixth potential voltage is greater than the second threshold voltage, and the seventh potential voltage is greater than the first threshold voltage.

In some second embodiments, the second potential voltage is equal to the first potential voltage, the first potential voltage is greater than the first threshold voltage and less than the second threshold voltage, the third potential voltage is less than a threshold voltage of the first drain selector, the fourth potential voltage is greater than a threshold voltage of the second drain selector, the fifth potential voltage is greater than the second threshold voltage, the sixth potential voltage is greater than the second threshold voltage, and the seventh potential voltage is greater than the first threshold voltage.

In some third embodiments, the first potential voltage is greater than the second threshold voltage and less than the first threshold voltage, the second potential voltage is less than the second threshold voltage, the third potential voltage is greater than a threshold voltage of the first drain selector, the fourth potential voltage is greater than a threshold voltage of the second drain selector, and the fifth potential voltage, the sixth potential voltage, and the seventh potential voltage are greater than the first threshold voltage.

In some fourth embodiments, the second potential voltage is greater than the second threshold voltage and less than the first threshold voltage, the first potential voltage is less than the second threshold voltage, the third potential voltage is greater than a threshold voltage of the first drain selector, the fourth potential voltage is greater than a threshold voltage of the second drain selector, and the fifth potential voltage, the sixth potential voltage, and the seventh potential voltage are greater than the first threshold voltage.

In some embodiments, the threshold voltage setting step further includes:

when the third data is the binary value of 1 and the fourth data is the binary value of 0, setting a threshold voltage of the third memory cell or third memory cells to be used that store the third data as the first threshold voltage, and setting a threshold voltage of the fourth memory cell or fourth memory cells to be used that store the fourth data as the second threshold voltage.

In yet some embodiments, the threshold voltage setting step further includes:

when the third data is the binary value of 0 and the fourth data is the binary value of 1, setting a threshold voltage of the third memory cell or third memory cells to be used that store the third data as the second threshold voltage, and setting a threshold voltage of the fourth memory cell or fourth memory cells to be used that store the fourth data as the first threshold voltage.

In some other embodiments, the threshold voltage setting step further includes:

when the third data is the binary value of 0 and the fourth data is the binary value of 0, setting a threshold voltage of the third memory cell or third memory cells to be used that store the third data as the second threshold voltage, and setting a threshold voltage of the fourth memory cell or fourth memory cells to be used that store the fourth data as the second threshold voltage.

In some fifth embodiments, the second potential voltage is equal to the first potential voltage, the first potential voltage is greater than the first threshold voltage and less than the second threshold voltage, the third potential voltage is greater than a threshold voltage of the first drain selector, the fourth potential voltage is greater than a threshold voltage of the second drain selector, the fifth potential voltage is greater than the second threshold voltage, the sixth potential voltage is greater than the first threshold voltage and less than the second threshold voltage, and the seventh potential voltage is greater than the first threshold voltage.

In some sixth embodiments, the second potential voltage is equal to the first potential voltage, the first potential voltage is greater than the first threshold voltage and less than the second threshold voltage, the third potential voltage is greater than a threshold voltage of the first drain selector, the fourth potential voltage is greater than a threshold voltage of the second drain selector, the fifth potential voltage is greater than the first threshold voltage and less than the second threshold voltage, the sixth potential voltage is greater than the second threshold voltage, and the seventh potential voltage is greater than the first threshold voltage.

In some embodiments, the threshold voltage setting step further includes:

when the third data is the binary value of 0 and the fourth data is the binary value of 0, setting a threshold voltage of the third memory cell or third memory cells to be used that store the third data as a third threshold voltage, and setting a threshold voltage of the fourth memory cell or fourth memory cells to be used that store the fourth data as the third threshold voltage, where a range of the third threshold voltage is greater than a range of the second threshold voltage.

In some seventh embodiments, the second potential voltage is equal to the first potential voltage, the first potential voltage is greater than the first threshold voltage and less than the second threshold voltage, the third potential voltage is greater than a threshold voltage of the first drain selector, the fourth potential voltage is greater than a threshold voltage of the second drain selector, the fifth potential voltage is greater than the third threshold voltage, the sixth potential voltage is less than the third threshold voltage, and the seventh potential voltage is greater than the first threshold voltage.

In some eighth embodiments, the second potential voltage is equal to the first potential voltage, the first potential voltage is greater than the first threshold voltage and less than the second threshold voltage, the third potential voltage is greater than a threshold voltage of the first drain selector, the fourth potential voltage is greater than a threshold voltage of the second drain selector, the fifth potential voltage is less than the third threshold voltage, the sixth potential voltage is greater than the third threshold voltage, and the seventh potential voltage is greater than the first threshold voltage.

Figure 4:
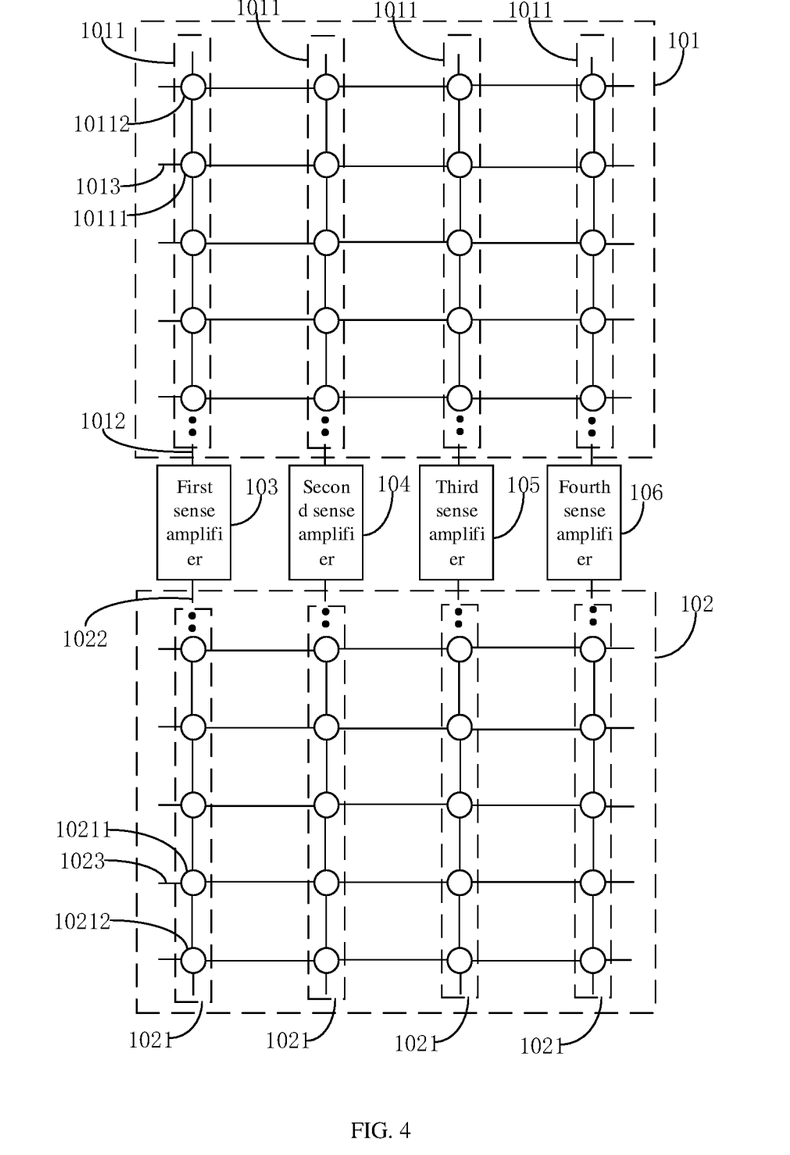
FIG. 4 is a schematic structural diagram of a NAND flash memory in some embodiments of the present invention.

FIG. 4 is a schematic structural diagram of a NAND flash memory in some embodiments of the present invention. Referring to FIG. 4, the NAND flash memory includes a first memory block 101, a second memory block 102, a first sense amplifier 103, a second sense amplifier 104, a third sense amplifier 105, and a fourth sense amplifier 106.

Referring to FIG. 4, the first memory block 101 includes four first synaptic strings 1011, four first bit lines 1012, and four first word lines 1013. The second memory block 102 includes four second synaptic strings 1021, four second bit lines 1022, and four second word lines 1023. Each of the first synaptic strings 1011 includes four first memory cells 10111 connected in series and a first drain selector 10112. Each of the second synaptic strings 1021 includes four second memory cells 10211 connected in series and a second drain selector 10212.

Referring to FIG. 4, a first one of the first synaptic strings 1011 is connected to the first sense amplifier 103 via a first one of the first bit lines 1012. A first one of the second synaptic strings 1021 is connected to the first sense amplifier 103 via a first one of the second bit lines 1022. A second one of the first synaptic strings 1011 is connected to the second sense amplifier 104 via a second one of the first bit lines 1012. A second one of the second synaptic strings 1021 is connected to the second sense amplifier 104 via a second one of the second bit lines 1022. A third one of the first synaptic strings 1011 is connected to the third sense amplifier 105 via a third one of the first bit lines 1012. A third one of the second synaptic strings 1021 is connected to the third sense amplifier 105 via a third one of the second bit lines 1022. A fourth one of the first synaptic strings 1011 is connected to the fourth sense amplifier 106 via a fourth one of the first bit lines 1012. A fourth one of the second synaptic strings 1021 is connected to the fourth sense amplifier 106 via a fourth one of the second bit lines 1022.

Referring to FIG. 4, a first one of the first word lines 1013 is connected to a first one of the first memory cells 10111 of the first one of the first synaptic strings 1011, a first one of the first memory cells 10111 of the second one of the first synaptic strings 1011, a first one of the first memory cells 10111 of the third one of the first synaptic strings 1011, and a first one of the first memory cells 10111 of the fourth one of the first synaptic strings 1011. A second one of the first word lines 1013 is connected to a second one of the first memory cells 10111 of the first one of the first synaptic strings 1011, a second one of the first memory cells 10111 of the second one of the first synaptic strings 1011, a second one of the first memory cells 10111 of the third one of the first synaptic strings 1011, and a second one of the first memory cells 10111 of the fourth one of the first synaptic strings 1011. A third one of the first word lines 1013 is connected to a third one of the first memory cells 10111 of the first one of the first synaptic strings 1011, a third one of the first memory cells 10111 of the second one of the first synaptic strings 1011, a third one of the first memory cells 10111 of the third one of the first synaptic strings 1011, and a third one of the first memory cells 10111 of the fourth one of the first synaptic strings 1011. A fourth one of the first word lines 1013 is connected to a fourth one of the first memory cells 10111 of the first one of the first synaptic strings 1011, a fourth one of the first memory cells 10111 of the second one of the first synaptic strings 1011, a fourth one of the first memory cells 10111 of the third one of the first synaptic strings 1011, and a fourth one of the first memory cells 10111 of the fourth one of the first synaptic strings 1011.

Referring to FIG. 4, a first one of the second word lines 1023 is connected to a first one of the second memory cells 10211 of the first one of the second synaptic strings 1021, a first one of the second memory cells 10211 of the second one of the second synaptic strings 1021, a first one of the second memory cells 10211 of the third one of the second synaptic strings 1021, and a first one of the second memory cells 10211 of the fourth one of the second synaptic strings 1021. A second one of the second word lines 1023 is connected to a second one of the second memory cells 10211 of the first one of the second synaptic strings 1021, a second one of the second memory cells 10211 of the second one of the second synaptic strings 1021, a second one of the second memory cells 10211 of the third one of the second synaptic strings 1021, and a second one of the second memory cells 10211 of the fourth one of the second synaptic strings 1021. A third one of the second word lines 1023 is connected to a third one of the second memory cells 10211 of the first one of the second synaptic strings 1021, a third one of the second memory cells 10211 of the second one of the second synaptic strings 1021, a third one of the second memory cells 10211 of the third one of the second synaptic strings 1021, and a third one of the second memory cells 10211 of the fourth one of the second synaptic strings 1021. A fourth one of the second word lines 1023 is connected to a fourth one of the second memory cells 10211 of the first one of the second synaptic strings 1021, a fourth one of the second memory cells 10211 of the second one of the second synaptic strings 1021, a fourth one of the second memory cells 10211 of the third one of the second synaptic strings 1021, and a fourth one of the second memory cells 10211 of the fourth one of the second synaptic strings 1021.

Figure 5:
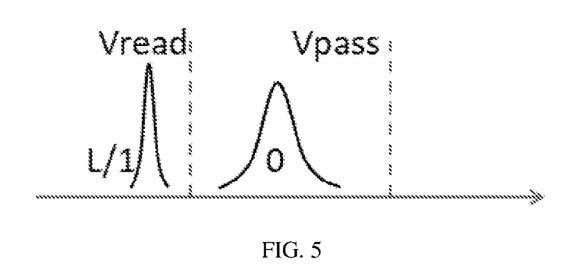
FIG. 5 is a schematic diagram of a threshold voltage range for a memory cell in some embodiments of the present invention.

FIG. 5 is a schematic diagram of a threshold voltage range for a memory cell in some embodiments of the present invention. Reference is made to FIG. 5, in which L/1 represents a first threshold voltage, 0 represents a second threshold voltage, Vread represents a first potential voltage, Vpass represents a seventh potential voltage, and both the fifth potential voltage and the sixth potential voltage are equal to the seventh potential voltage.

Figure 6:
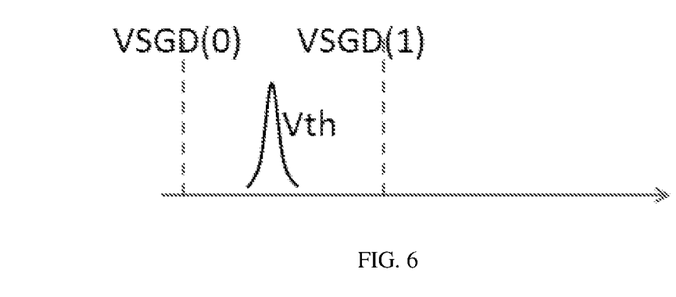
FIG. 6 is a schematic diagram of a threshold voltage range for a first drain selector in some embodiments of the present invention.

FIG. 6 is a schematic diagram of a threshold voltage range for a first drain selector in some embodiments of the present invention. Referring to FIG. 6, VSGD(0) represents a voltage when binary data of 0 is input, and VSGD(1) represents a voltage when binary data of 1 is input. The threshold voltage of the second drain selector 10212 is the same as that of the first drain selector 10112.

In some embodiments, referring to FIG. 4, FIG. 5, and FIG. 6, first data is written into the first one of the first memory cells 10111 of the first one of the first synaptic strings 1011 of the first memory block 101, where the first data is the binary data of 0. Third data is written into the second one of the first memory cells 10111 of the first one of the first synaptic strings 1011 of the first memory block 101, where the third data is the binary data of 1. Both the third one and the fourth one of the first memory cells 10111 of the first one of the first synaptic strings 1011 of the first memory block 101 do not store data. Second data is written into the first one of the second memory cells 10211 of the first one of the second synaptic strings 1021 of the second memory block 102, where the second data is the binary data of 1. Fourth data is written into the second one of the second memory cells 10211 of the first one of the second synaptic strings 1021 of the second memory block 102, where the fourth data is the binary data of 0. Both the third one and the fourth one of the second memory cells 10211 of the first one of the first synaptic strings 1011 of the second memory block 102 do not store data. The first one of the first memory cells 10111 of the first one of the first synaptic strings 1011 of the first memory block 101 is a first memory cell to be used. The first one of the second memory cells 10211 of the first one of the second synaptic strings 1021 of the second memory block 102 is a second memory cell to be used.

In some embodiments, referring to FIG. 4, FIG. 5, and FIG. 6, a threshold voltage of the first one of the first memory cells 10111 of the first one of the first synaptic strings 1011 of the first memory block 101 is set as the second threshold voltage. A threshold voltage of the second one of the first memory cells 10111 of the first one of the first synaptic strings 1011 of the first memory block 101 is set as the first threshold voltage. A threshold voltage of the third one and the fourth one of the first memory cells 10111 of the first one of the first synaptic strings 1011 of the first memory block 101 is set as the first threshold voltage. A threshold voltage of the first one of the second memory cells 10211 of the first one of the second synaptic strings 1021 of the second memory block 102 is set as the first threshold voltage. A threshold voltage of the second one of the second memory cells 10211 of the first one of the second synaptic strings 1021 of the second memory block 102 is set as the second threshold voltage. A threshold voltage of the third one and the fourth one of the second memory cells 10211 of the first one of the first synaptic strings 1011 of the second memory block 102 is set as the first threshold voltage.

In some embodiments, referring to FIG. 4, FIG. 5, and FIG. 6, a third potential voltage is applied to the first drain selector 10112, where a magnitude of the third potential voltage is VSGD(0), equivalently, a binary value of 0 for the XNOR operation is provided. A fourth potential voltage is applied to the second drain selector 10212, where a magnitude of the fourth potential voltage is VSGD(1). The first potential voltage is applied to the first one of the first word lines 1013. A fifth potential voltage is applied to the second one of the first word lines 1013. The seventh potential voltage is applied to the third one and the fourth one of the first word lines 1013. The second potential voltage is applied to the first one of the second word lines 1023, where the second potential voltage is equal to the first potential voltage. A sixth potential voltage is applied to the second one of the second word lines 1023. The seventh potential voltage is applied to the third one and the fourth one of the second word lines 1023. The data is read from the first one of the first synaptic strings 1011 of the first memory block 101 and the first one of the second synaptic strings 1021 of the second memory block 102 by the first sense amplifier 103, to obtain result data, where the result data is 1, that is, the XNOR operation of the binary data of 0 and the binary data of 0 is implemented by the NAND flash memory.

In yet some embodiments, referring to FIG. 4, FIG. 5, and FIG. 6, first data is written into the first one of the first memory cells 10111 of the first one of the first synaptic strings 1011 of the first memory block 101, where the first data is the binary data of 1. Third data is written into the second one of the first memory cells 10111 of the first one of the first synaptic strings 1011 of the first memory block 101, where the third data is the binary data of 1. Both the third one and the fourth one of the first memory cells 10111 of the first one of the first synaptic strings 1011 of the first memory block 101 do not store data. Second data is written into the first one of the second memory cells 10211 of the first one of the second synaptic strings 1021 of the second memory block 102, where the second data is the binary data of 0. Fourth data is written into the second one of the second memory cells 10211 of the first one of the second synaptic strings 1021 of the second memory block 102, where the fourth data is the binary data of 0. Both the third one and the fourth one of the second memory cells 10211 of the first one of the first synaptic strings 1011 of the second memory block 102 do not store data. The first one of the first memory cells 10111 of the first one of the first synaptic strings 1011 of the first memory block 101 is a first memory cell to be used. The first one of the second memory cells 10211 of the first one of the second synaptic strings 1021 of the second memory block 102 is a second memory cell to be used.

In yet some embodiments, referring to FIG. 4, FIG. 5, and FIG. 6, a threshold voltage of the first one of the first memory cells 10111 of the first one of the first synaptic strings 1011 of the first memory block 101 is set as the first threshold voltage. A threshold voltage of the second one of the first memory cells 10111 of the first one of the first synaptic strings 1011 of the first memory block 101 is set as the first threshold voltage. A threshold voltage of the third one and the fourth one of the first memory cells 10111 of the first one of the first synaptic strings 1011 of the first memory block 101 is set as the first threshold voltage. A threshold voltage of the first one of the second memory cells 10211 of the first one of the second synaptic strings 1021 of the second memory block 102 is set as the second threshold voltage. A threshold voltage of the second one of the second memory cells 10211 of the first one of the second synaptic strings 1021 of the second memory block 102 is set as the second threshold voltage. A threshold voltage of the third one and the fourth one of the second memory cells 10211 of the first one of the first synaptic strings 1011 of the second memory block 102 is set as the first threshold voltage.

In yet some embodiments, referring to FIG. 4, FIG. 5, and FIG. 6, a third potential voltage is applied to the first drain selector 10112, where a magnitude of the third potential voltage is VSGD(1), equivalently, a binary value of 1 for the XNOR operation is provided. A fourth potential voltage is applied to the second drain selector 10212, where a magnitude of the fourth potential voltage is VSGD(0). The first potential voltage is applied to the first one of the first word lines 1013. A fifth potential voltage is applied to the second one of the first word lines 1013. The seventh potential voltage is applied to the third one and the fourth one of the first word lines 1013. The second potential voltage is applied to the first one of the second word lines 1023, where the second potential voltage is equal to the first potential voltage. A sixth potential voltage is applied to the second one of the second word lines 1023. The seventh potential voltage is applied to the third one and the fourth one of the second word lines 1023. The data is read from the first one of the first synaptic strings 1011 of the first memory block 101 and the first one of the second synaptic strings 1021 of the second memory block 102 by the first sense amplifier 103, to obtain result data, where the result data is 1, that is, the XNOR operation of the binary data of 1 and the binary data of 1 is implemented by the NAND flash memory.

Figure 7:
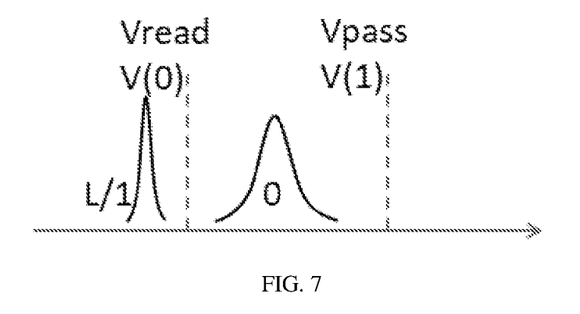
FIG. 7 is a schematic diagram of a threshold voltage range for a memory cell in yet some embodiments of the present invention.

FIG. 7 is a schematic diagram of a threshold voltage range for a memory cell in yet some embodiments of the present invention. Reference is made to FIG. 7, in which L/1 represents a first threshold voltage, 0 represents a second threshold voltage, Vread represents a first potential voltage, Vpass represents a seventh potential voltage, V(0) represents a voltage when binary data of 0 is input, and V(1) represents a voltage when binary data of 1 is input.

Figure 8:
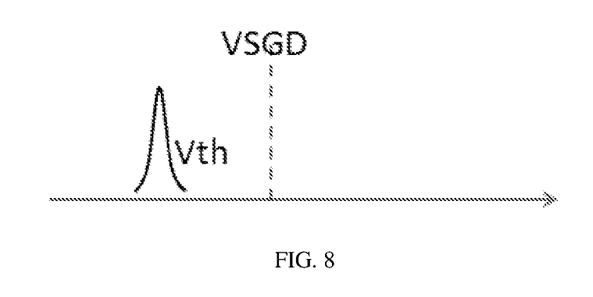
FIG. 8 is a schematic diagram of a threshold voltage range for a first drain selector in yet some embodiments of the present invention.

FIG. 8 is a schematic diagram of a threshold voltage range for a first drain selector 10112 in yet some embodiments of the present invention. Referring to FIG. 8, Vth represents the threshold voltage range for the first drain selector 10112, and VSGD represents a third potential voltage that is greater than the threshold voltage of the first drain selector 10112. The threshold voltage of the second drain selector 10212 is the same as that of the first drain selector 10112. The fourth potential voltage is the same as the third potential voltage.

In some embodiments, referring to FIG. 4, FIG. 7, and FIG. 8, first data is written into the first one of the first memory cells 10111 of the first one of the first synaptic strings 1011 of the first memory block 101, where the first data is the binary data of 0. Third data is written into the second one of the first memory cells 10111 of the first one of the first synaptic strings 1011 of the first memory block 101, where the third data is the binary data of 0. Both the third one and the fourth one of the first memory cells 10111 of the first one of the first synaptic strings 1011 of the first memory block 101 do not store data. Second data is written into the first one of the second memory cells 10211 of the first one of the second synaptic strings 1021 of the second memory block 102, where the second data is the binary data of 1. Fourth data is written into the second one of the second memory cells 10211 of the first one of the second synaptic strings 1021 of the second memory block 102, where the fourth data is the binary data of 0. Both the third one and the fourth one of the second memory cells 10211 of the first one of the first synaptic strings 1011 of the second memory block 102 do not store data. The first one of the first memory cells 10111 of the first one of the first synaptic strings 1011 of the first memory block 101 is a first memory cell to be used. The first one of the second memory cells 10211 of the first one of the second synaptic strings 1021 of the second memory block 102 is a second memory cell to be used.

In some embodiments, referring to FIG. 4, FIG. 7, and FIG. 8, a threshold voltage of the first one of the first memory cells 10111 of the first one of the first synaptic strings 1011 of the first memory block 101 is set as the second threshold voltage. A threshold voltage of the second one of the first memory cells 10111 of the first one of the first synaptic strings 1011 of the first memory block 101 is set as the second threshold voltage. A threshold voltage of the third one and the fourth one of the first memory cells 10111 of the first one of the first synaptic strings 1011 of the first memory block 101 is set as the first threshold voltage. A threshold voltage of the first one of the second memory cells 10211 of the first one of the second synaptic strings 1021 of the second memory block 102 is set as the first threshold voltage. A threshold voltage of the second one of the second memory cells 10211 of the first one of the second synaptic strings 1021 of the second memory block 102 is set as the second threshold voltage. A threshold voltage of the third one and the fourth one of the second memory cells 10211 of the first one of the first synaptic strings 1011 of the second memory block 102 is set as the first threshold voltage.

In some embodiments, referring to FIG. 4, FIG. 7, and FIG. 8, a third potential voltage is applied to the first drain selector 10112, where a magnitude of the third potential voltage is VSGD. A fourth potential voltage is applied to the second drain selector 10212, where a magnitude of the fourth potential voltage is VSGD. The first potential voltage is applied to the first one of the first word lines 1013. A fifth potential voltage is applied to the second one of the first word lines 1013, where a magnitude of the fifth potential voltage is V(0), equivalently, the binary data of 0 for the XNOR operation is provided. The seventh potential voltage is applied to the third one and the fourth one of the first word lines 1013. The second potential voltage is applied to the first one of the second word lines 1023, where the second potential voltage is equal to the first potential voltage. A sixth potential voltage is applied to the second one of the second word lines 1023, where a magnitude of the sixth potential voltage is V(1). The seventh potential voltage is applied to the third one and the fourth one of the second word lines 1023. The data is read from the first one of the first synaptic strings 1011 of the first memory block 101 and the first one of the second synaptic strings 1021 of the second memory block 102 by the first sense amplifier 103, to obtain result data, where the result data is 1, that is, the XNOR operation of the binary data of 0 and the binary data of 0 is implemented by the NAND flash memory.

In yet some embodiments, referring to FIG. 4, FIG. 7, and FIG. 8, first data is written into the first one of the first memory cells 10111 of the first one of the first synaptic strings 1011 of the first memory block 101, where the first data is the binary data of 1. Third data is written into the second one of the first memory cells 10111 of the first one of the first synaptic strings 1011 of the first memory block 101, where the third data is the binary data of 0. Both the third one and the fourth one of the first memory cells 10111 of the first one of the first synaptic strings 1011 of the first memory block 101 do not store data. Second data is written into the first one of the second memory cells 10211 of the first one of the second synaptic strings 1021 of the second memory block 102, where the second data is the binary data of 0. Fourth data is written into the second one of the second memory cells 10211 of the first one of the second synaptic strings 1021 of the second memory block 102, where the fourth data is the binary data of 0. Both the third one and the fourth one of the second memory cells 10211 of the first one of the first synaptic strings 1011 of the second memory block 102 do not store data. The first one of the first memory cells 10111 of the first one of the first synaptic strings 1011 of the first memory block 101 is a first memory cell to be used. The first one of the second memory cells 10211 of the first one of the second synaptic strings 1021 of the second memory block 102 is a second memory cell to be used.

In yet some embodiments, referring to FIG. 4, FIG. 7, and FIG. 8, a threshold voltage of the first one of the first memory cells 10111 of the first one of the first synaptic strings 1011 of the first memory block 101 is set as the first threshold voltage. A threshold voltage of the second one of the first memory cells 10111 of the first one of the first synaptic strings 1011 of the first memory block 101 is set as the second threshold voltage. A threshold voltage of the third one and the fourth one of the first memory cells 10111 of the first one of the first synaptic strings 1011 of the first memory block 101 is set as the first threshold voltage. A threshold voltage of the first one of the second memory cells 10211 of the first one of the second synaptic strings 1021 of the second memory block 102 is set as the second threshold voltage. A threshold voltage of the second one of the second memory cells 10211 of the first one of the second synaptic strings 1021 of the second memory block 102 is set as the second threshold voltage. A threshold voltage of the third one and the fourth one of the second memory cells 10211 of the first one of the first synaptic strings 1011 of the second memory block 102 is set as the first threshold voltage.

In some embodiments, referring to FIG. 4, FIG. 7, and FIG. 8, a third potential voltage is applied to the first drain selector 10112, where a magnitude of the third potential voltage is VSGD. A fourth potential voltage is applied to the second drain selector 10212, where a magnitude of the fourth potential voltage is VSGD. The first potential voltage is applied to the first one of the first word lines 1013. A fifth potential voltage is applied to the second one of the first word lines 1013, where a magnitude of the fifth potential voltage is V(1), equivalently, the binary data of 1 for the XNOR operation is provided. The seventh potential voltage is applied to the third one and the fourth one of the first word lines 1013. The second potential voltage is applied to the first one of the second word lines 1023, where the second potential voltage is equal to the first potential voltage. A sixth potential voltage is applied to the second one of the second word lines 1023, where a magnitude of the sixth potential voltage is V(0). The seventh potential voltage is applied to the third one and the fourth one of the second word lines 1023. The data is read from the first one of the first synaptic strings 1011 of the first memory block 101 and the first one of the second synaptic strings 1021 of the second memory block 102 by the first sense amplifier 103, to obtain result data, where the result data is 1, that is, the XNOR operation of the binary data of 1 and the binary data of 1 is implemented by the NAND flash memory.

Figure 9:
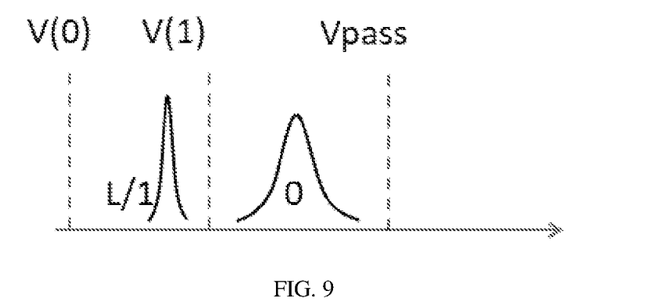
FIG. 9 is a schematic diagram of a threshold voltage range for a memory cell in some other embodiments of the present invention.

FIG. 9 is a schematic diagram of a threshold voltage range for a memory cell in some other embodiments of the present invention. Reference is made to FIG. 9, in which L/1 represents a first threshold voltage, 0 represents a second threshold voltage, Vpass represents a fifth potential voltage, a sixth potential voltage, and a seventh potential voltage, V(0) represents a voltage when binary data of 0 is input, and V(1) represents a voltage when binary data of 1 is input.

Referring to FIG. 4, FIG. 8, and FIG. 9, a third potential voltage is applied to the first drain selector 10112, where a magnitude of the third potential voltage is VSGD. A fourth potential voltage is applied to the second drain selector 10212, where a magnitude of the fourth potential voltage is VSGD. A first potential voltage is applied to the first one of the first word lines 1013, where a magnitude of the first potential voltage is V(1), equivalently, the binary data of 1 for the XNOR operation is provided. The fifth potential voltage is applied to the second one of the first word lines 1013, where a magnitude of the fifth potential voltage is Vpass. The seventh potential voltage is applied to the third one and the fourth one of the first word lines 1013, where a magnitude of the seventh potential voltage is Vpass. A second potential voltage is applied to the first one of the second word lines 1023, where a magnitude of the second potential voltage is V(0). The sixth potential voltage is applied to the second one of the second word lines 1023, where a magnitude of the sixth potential voltage is Vpass. The seventh potential voltage is applied to the third one and the fourth one of the second word lines 1023. The data is read from the first one of the first synaptic strings 1011 of the first memory block 101 and the first one of the second synaptic strings 1021 of the second memory block 102 by the first sense amplifier 103, to obtain result data, where the result data is 1, that is, the XNOR operation of the binary data of 1 and the binary data of 1 is implemented by the NAND flash memory.

In some embodiments, the way of performing the XNOR operation via the second synaptic string 1021 of the first memory block 101, the second synaptic string 1021 of the second memory block 102, and the second sense amplifier 104, or performing the XNOR operation via the other synaptic strings and the corresponding sense amplifiers is the same as the way of performing the XNOR operation via the first synaptic string 1011 of the first memory block 101, the first synaptic string 1011 of the second memory block 102, and the first sense amplifier 103, and thus will not be repeated herein.

In some embodiments, there is an inversion in results of the sense amplifiers. The results of the sense amplifiers are inverted to obtain a result of the XNOR operation.

In some embodiments of the present invention, each sense amplifier is connected to multiple memory blocks. When the steps S1 to S3 are performed in the multiple storage blocks, the current read by the corresponding sense amplifier is a cumulative current, that is, each piece of binary data of 1 corresponds to a current. The current can be converted into digits through an analog-to-digital converter, to obtain the amount of the binary data of 1 in the current read by the corresponding sense amplifier. A difference between the total amount of the first data written and the amount of the binary data of 1 is the amount of the binary data of 0.

While the embodiments of the present invention have been described in detail above, it is apparent to those skilled in the art that various modifications and variations can be made to these embodiments. However, it is to be understood that such modifications and variations all fall within the scope and spirit of the present invention as described in the claims. Furthermore, the present invention described herein may have other embodiments and may be carried out or implemented in various ways.

What is claimed is:

1. A method for controlling a NAND flash memory to implement an XNOR operation, comprising the following steps:

S0: providing a NAND flash memory, wherein the NAND flash memory comprises at least one first memory block, at least one second memory block, and multiple sense amplifiers, the first memory block comprises multiple first synaptic strings, multiple first bit lines, and multiple first word lines, each of the first synaptic strings comprises a first drain selector and a first memory module connected in series, the first memory module comprises multiple first memory cells connected in series, the first synaptic strings are connected to the first bit lines in a one-to-one correspondence manner, the first word lines are connected to all the first memory cells, the second memory block comprises multiple second synaptic strings, multiple second bit lines, and multiple second word lines, each of the second synaptic strings comprises a second drain selector and a second memory module connected in series, the second memory module comprises multiple second memory cells connected in series, the second synaptic strings are connected to the second bit lines in a one-to-one correspondence manner, the second word lines are connected to all the second memory cells, and the first word lines and the second word lines are connected to the sense amplifiers in a one-to-one correspondence manner;

S1: taking the first synaptic strings and the second synaptic strings connected to a common one of the sense amplifiers as associated synaptic strings, taking any one of the first memory cells of the first synaptic strings used as the associated synaptic string as a first memory cell to be used, taking any one of the second memory cells of the second synaptic strings used as the associated synaptic string as a second memory cell to be used, writing first data into the first memory cell to be used, and writing second data into the second memory cell to be used, wherein the first data and the second data are mutually inverted data;

S2: taking the remaining first memory cells of the first synaptic strings used as the associated synaptic string as a third memory cell or third memory cells to be used, taking the remaining second memory cells of the second synaptic strings used as the associated synaptic string as a fourth memory cell or fourth memory cells to be used, writing third data into part or all of the third memory cell or third memory cells to be used, and writing fourth data into part or all of the fourth memory cell or fourth memory cells to be used;

S3: applying a first potential voltage to a corresponding one of the first word lines connected to the first memory cell to be used, applying a second potential voltage to a corresponding one of the second word lines connected to the second memory cell to be used, applying a third potential voltage to the first drain selector, applying a fourth potential voltage to the second drain selector, applying a fifth potential voltage to a corresponding one of the first word lines connected to the third memory cell or third memory cells to be used in which the third data is written, applying a sixth potential voltage to a corresponding one of the second word lines connected to the fourth memory cell or fourth memory cells to be used in which the fourth data is written, and applying a seventh potential voltage to a corresponding one of the first word lines connected to the third memory cell or third memory cells to be used that do not store data and a corresponding one of the second word lines connected to the fourth memory cell or fourth memory cells to be used that do not store data; and S4: reading the data from the first synaptic strings and the second synaptic strings used as the associated synaptic strings by the corresponding one of the sense amplifiers.

2. The method for controlling a NAND flash memory to implement an XNOR operation according to claim 1, wherein before the step S1 is performed, the method further comprises a threshold voltage setting step; the first data, the second data, the third data, and the fourth data are all binary values; and when the first data is a binary value of 1 and the second data is a binary value of 0, the threshold voltage setting step comprises:

setting a threshold voltage of the first memory cell to be used as a first threshold voltage, setting a threshold voltage of the second memory cell to be used as a second threshold voltage, and setting a threshold voltage of the third memory cell or third memory cells to be used that do not store the data and the fourth memory cell or fourth memory cells to be used that do not store the data as the first threshold voltage, wherein the first threshold voltage is less than the second threshold voltage.

3. The method for controlling a NAND flash memory to implement an XNOR operation according to claim 1, wherein before the step S1 is performed, the method further comprises a threshold voltage setting step; the first data, the second data, the third data, and the fourth data are all binary values; and when the first data is a binary value of 0 and the second data is a binary value of 1, the threshold voltage setting step comprises:

setting a threshold voltage of the second memory cell to be used as a first threshold voltage, setting a threshold voltage of the first memory cell to be used as a second threshold voltage, and setting a threshold voltage of the third memory cell or third memory cells to be used that do not store the data and the fourth memory cell or fourth memory cells to be used that do not store the data as the first threshold voltage, wherein the first threshold voltage is less than the second threshold voltage.

4. The method for controlling a NAND flash memory to implement an XNOR operation according to claim 2, wherein the threshold voltage setting step further comprises:

when the third data is the binary value of 1 and the fourth data is the binary value of 0, setting a threshold voltage of the third memory cell or third memory cells to be used that store the third data as the first threshold voltage, and setting a threshold voltage of the fourth memory cell or fourth memory cells to be used that store the fourth data as the second threshold voltage.

5. The method for controlling a NAND flash memory to implement an XNOR operation according to claim 2, wherein the threshold voltage setting step further comprises:

when the third data is the binary value of 0 and the fourth data is the binary value of 1, setting a threshold voltage of the third memory cell or third memory cells to be used that store the third data as the second threshold voltage, and setting a threshold voltage of the fourth memory cell or fourth memory cells to be used that store the fourth data as the first threshold voltage.

6. The method for controlling a NAND flash memory to implement an XNOR operation according to claim 2, wherein the threshold voltage setting step further comprises:
when the third data is the binary value of 0 and the fourth data is the binary value of 0, setting a threshold voltage of the third memory cell or third memory cells to be used that store the third data as the second threshold voltage, and setting a threshold voltage of the fourth memory cell or fourth memory cells to be used that store the fourth data as the second threshold voltage.

7. The method for controlling a NAND flash memory to implement an XNOR operation according to claim 6, wherein the second potential voltage is equal to the first potential voltage, the first potential voltage is greater than the first threshold voltage and less than the second threshold voltage, the third potential voltage is greater than a threshold voltage of the first drain selector, the fourth potential voltage is greater than a threshold voltage of the second drain selector, the fifth potential voltage is greater than the second threshold voltage, the sixth potential voltage is greater than the first threshold voltage and less than the second threshold voltage, and the seventh potential voltage is greater than the first threshold voltage.

8. The method for controlling a NAND flash memory to implement an XNOR operation according to claim 6, wherein the second potential voltage is equal to the first potential voltage, the first potential voltage is greater than the first threshold voltage and less than the second threshold voltage, the third potential voltage is greater than a threshold voltage of the first drain selector, the fourth potential voltage is greater than a threshold voltage of the second drain selector, the fifth potential voltage is greater than the first threshold voltage and less than the second threshold voltage, the sixth potential voltage is greater than the second threshold voltage, and the seventh potential voltage is greater than the first threshold voltage.

9. The method for controlling a NAND flash memory to implement an XNOR operation according to claim 2, wherein the threshold voltage setting step further comprises:
when the third data is the binary value of 0 and the fourth data is the binary value of 0, setting a threshold voltage of the third memory cell or third memory cells to be used that store the third data as a third threshold voltage, and setting a threshold voltage of the fourth memory cell or fourth memory cells to be used that store the fourth data as the third threshold voltage, wherein a range of the third threshold voltage is greater than a range of the second threshold voltage.

10. The method for controlling a NAND flash memory to implement an XNOR operation according to claim 9, wherein the second potential voltage is equal to the first potential voltage, the first potential voltage is greater than the first threshold voltage and less than the second threshold voltage, the third potential voltage is greater than a threshold voltage of the first drain selector, the fourth potential voltage is greater than a threshold voltage of the second drain selector, the fifth potential voltage is greater than the third threshold voltage, the sixth potential voltage is less than the third threshold voltage, and the seventh potential voltage is greater than the first threshold voltage.

11. The method for controlling a NAND flash memory to implement an XNOR operation according to claim 9, wherein the second potential voltage is equal to the first potential voltage, the first potential voltage is greater than the first threshold voltage and less than the second threshold voltage, the third potential voltage is greater than a threshold voltage of the first drain selector, the fourth potential voltage is greater than a threshold voltage of the second drain selector, the fifth potential voltage is less than the third threshold voltage, the sixth potential voltage is greater than the third threshold voltage, and the seventh potential voltage is greater than the first threshold voltage.

12. The method for controlling a NAND flash memory to implement an XNOR operation according to claim 2, wherein the second potential voltage is equal to the first potential voltage, the first potential voltage is greater than the first threshold voltage and less than the second threshold voltage, the third potential voltage is greater than a threshold voltage of the first drain selector, the fourth potential voltage is less than a threshold voltage of the second drain selector, the fifth potential voltage is greater than the second threshold voltage, the sixth potential voltage is greater than the second threshold voltage, and the seventh potential voltage is greater than the first threshold voltage.

13. The method for controlling a NAND flash memory to implement an XNOR operation according to claim 2, wherein the second potential voltage is equal to the first potential voltage, the first potential voltage is greater than the first threshold voltage and less than the second threshold voltage, the third potential voltage is less than a threshold voltage of the first drain selector, the fourth potential voltage is greater than a threshold voltage of the second drain selector, the fifth potential voltage is greater than the second threshold voltage, the sixth potential voltage is greater than the second threshold voltage, and the seventh potential voltage is greater than the first threshold voltage.

14. The method for controlling a NAND flash memory to implement an XNOR operation according to claim 2, wherein the first potential voltage is greater than the second threshold voltage and less than the first threshold voltage, the second potential voltage is less than the second threshold voltage, the third potential voltage is greater than a threshold voltage of the first drain selector, the fourth potential voltage is greater than a threshold voltage of the second drain selector, and the fifth potential voltage, the sixth potential voltage, and the seventh potential voltage are each greater than the first threshold voltage.

15. The method for controlling a NAND flash memory to implement an XNOR operation according to claim 2, wherein the second potential voltage is greater than the second threshold voltage and less than the first threshold voltage, the first potential voltage is less than the second threshold voltage, the third potential voltage is greater than a threshold voltage of the first drain selector, the fourth potential voltage is greater than a threshold voltage of the second drain selector, and the fifth potential voltage, the sixth potential voltage, and the seventh potential voltage are each greater than the first threshold voltage.

* * * * *